United States Patent
Iwafuchi et al.

(10) Patent No.: US 9,654,754 B2
(45) Date of Patent: May 16, 2017

(54) IMAGE ADJUSTING APPARATUS AND METHOD, IMAGE ADJUSTING SYSTEM, AND NON-TRANSITORY COMPUTER READABLE MEDIUM

(75) Inventors: Toshihiro Iwafuchi, Kanagawa (JP); Noriko Sakai, Kanagawa (JP); Kazuhiko Horikawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 460 days.

(21) Appl. No.: 13/593,100

(22) Filed: Aug. 23, 2012

(65) Prior Publication Data
US 2013/0257895 A1    Oct. 3, 2013

(30) Foreign Application Priority Data
Mar. 27, 2012   (JP) ................... 2012-072233

(51) Int. Cl.
*H04N 9/68*   (2006.01)
*H04N 9/73*   (2006.01)
*G09G 5/02*   (2006.01)

(52) U.S. Cl.
CPC ............... *H04N 9/68* (2013.01); *G09G 5/02* (2013.01); *H04N 9/73* (2013.01); *G09G 2320/0242* (2013.01); *G09G 2320/0693* (2013.01)

(58) Field of Classification Search
CPC .. H04N 1/6058–1/6059; H04N 1/6077; H04N 9/73
USPC ........................................... 345/590
See application file for complete search history.

(56) References Cited

U.S. PATENT DOCUMENTS

2007/0052735 A1*  3/2007  Chou ..................... 345/690
2008/0055339 A1*  3/2008  Chao et al. ............. 345/690

FOREIGN PATENT DOCUMENTS

| JP | A-2003-234955 | 8/2003 |
| JP | A-2005-250476 | 9/2005 |
| JP | A-2007-281893 | 10/2007 |
| JP | A-2010-88016 | 4/2010 |

OTHER PUBLICATIONS

Office Action issued in Japanese Application No. 2012-072233 dated Jun. 25, 2013 (with translation).

* cited by examiner

*Primary Examiner* — Aaron M Richer
(74) *Attorney, Agent, or Firm* — Oliff PLC

(57) ABSTRACT

An image adjusting apparatus includes the following elements. A set color temperature obtaining unit obtains a set color temperature which is set when a white image is displayed, in an image display apparatus. A maximum tone value calculator calculates a maximum tone value of a reference color when the displayed white image is changed into a white image corresponding to the set color temperature. A tone characteristic setting unit sets a tone characteristic of the reference color on the basis of the calculated maximum tone value. If the calculated maximum tone value is decreased from a maximum tone value before the set color temperature is set, the tone characteristic setting unit corrects, in a region in which a tone value of an input image signal is equal to or smaller than a predetermined value, the tone characteristic so that a tone value of an output image signal is increased.

15 Claims, 13 Drawing Sheets

FIG. 4A

PROJECTOR

COLOR TEMPERATURE 6500 K (D65)

MONITOR (BEFORE CHANGING COLOR TEMPERATURE)

X 92.0, Y 102.5, Z 118.0

R 255, G 255, B 255

$\gamma$ 2.2

FIG. 4C

MONITOR (AFTER CHANGING COLOR TEMPERATURE)

R 200, G 224, B 255

IMAGE ADJUSTING APPARATUS AND METHOD, IMAGE ADJUSTING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-072233 filed Mar. 27, 2012.

BACKGROUND

Technical Field

The present invention relates to an image adjusting apparatus and method, an image adjusting system., and a non-transitory computer readable medium.

SUMMARY

According to an aspect of the invention, there is provided an image adjusting apparatus including: a set color temperature obtaining unit that obtains a set color temperature which is set as a color temperature when a white image is displayed in an image display apparatus which displays an image; a maximum tone value calculator that calculates a maximum tone value of a reference color to be obtained when the white image displayed in the image display apparatus is changed into a white image corresponding to the set color temperature obtained by the set color temperature obtaining unit; and a tone characteristic setting unit that sets a tone characteristic of the reference color corresponding to the set color temperature, on the basis of the maximum tone value of the reference color calculated by the maximum tone value calculator. If the maximum tone value of the reference color calculated by the maximum tone value calculator is decreased from a maximum tone value of the reference color which has been obtained before the set color temperature is set, the tone characteristic setting unit corrects, in a region in which a tone value of an input image signal is equal to or smaller than a predetermined value, the tone characteristic so that a tone value of an output image signal obtained as a result of converting the input image signal is increased.

BRIEF DESCRIPTION OF THE DRAWINGS

An exemplary embodiment of the present invention will be described in detail based on the following figures, wherein:

FIGS. 4A through 4C are examples of calculations carried out when adjusting the color temperature of an image displayed on a monitor;

DETAILED DESCRIPTION

An exemplary embodiment of the invention will be described below in detail with reference to the accompanying drawings.

Figure 1:
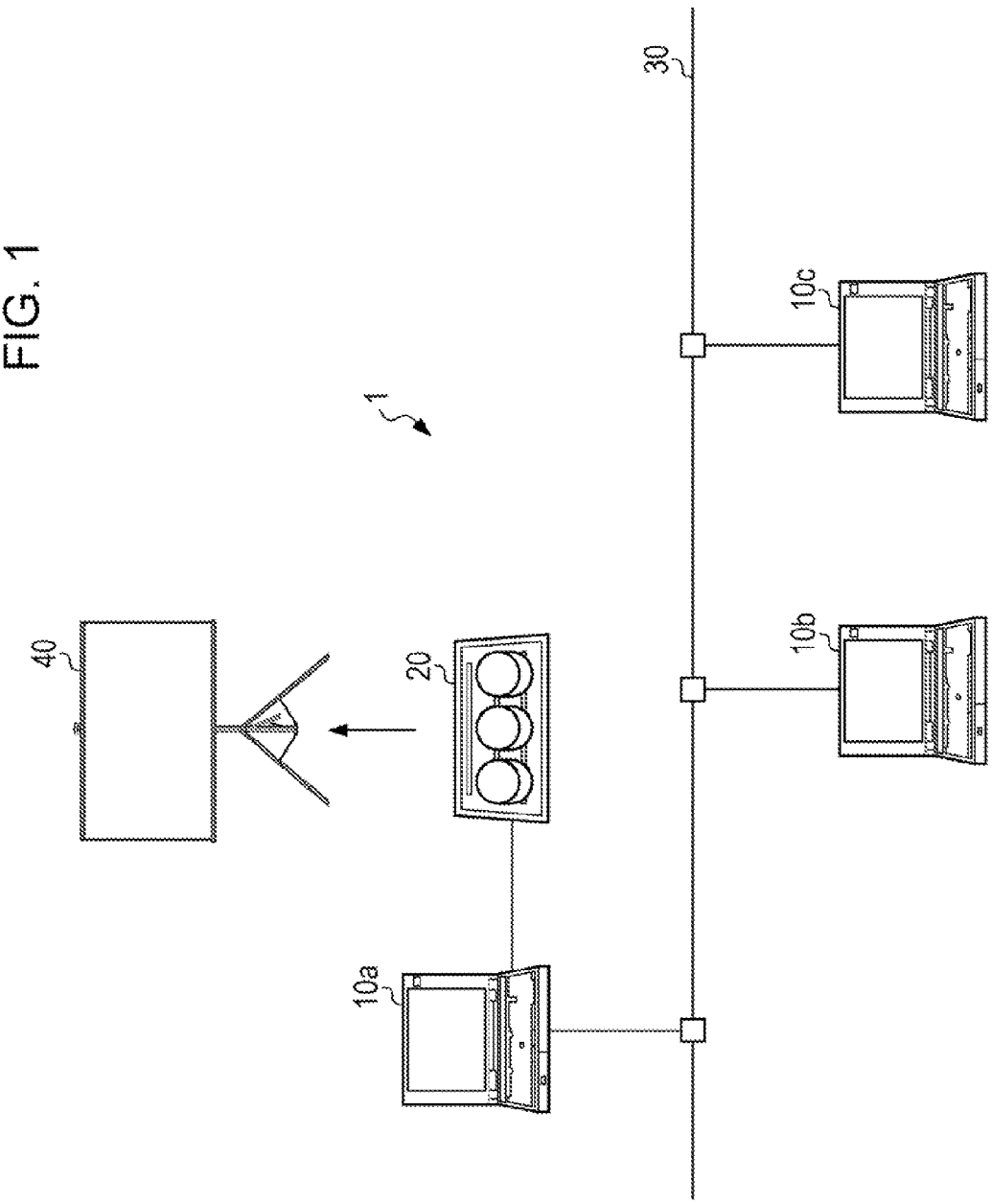
FIG. 1 illustrates an example of the overall configuration of an image adjusting system according to an exemplary embodiment of the invention.

FIG. 1 illustrates an example of the overall configuration of an image adjusting system 1 according to an exemplary embodiment of the invention.

The image adjusting system 1 includes terminal apparatuses 10a, 10b, and 10c, a projector 20 connected to the terminal apparatus 10a, and a network 30 connected to the terminal apparatuses 10a, 10b, and 10c. Each of the terminal apparatuses 10a, 10b, and 10c is an example of an image adjusting apparatus. In the following description, the terminal apparatuses 10a, 10b, and 10c will be simply referred to as a "terminal apparatus 10" or "terminal apparatuses 10" unless it is necessary to distinguish among them.

The terminal apparatus 10 is a computer, for example, a personal computer (PC), including a monitor that displays predetermined images. Details of the terminal apparatus 10 will be given later.

The projector 20 is a device that displays images or pictures by projecting them on, for example, a large screen. The projector 20 first displays an image on a cathode ray tube (CRT) or a liquid crystal display, and then enlarges the image by using a predetermined optical system, thereby displaying the image on a screen. A screen 40 is shown as a large screen, used with the projector 20, although it does not form the image adjusting system 1.

The network 30 is a communication medium, for example, a local area network (LAN), that allows the terminal apparatuses 10 to perform information communication among them.

The hardware configuration of the terminal apparatus 10 will be described below with reference to FIG. 2.

Figure 2:
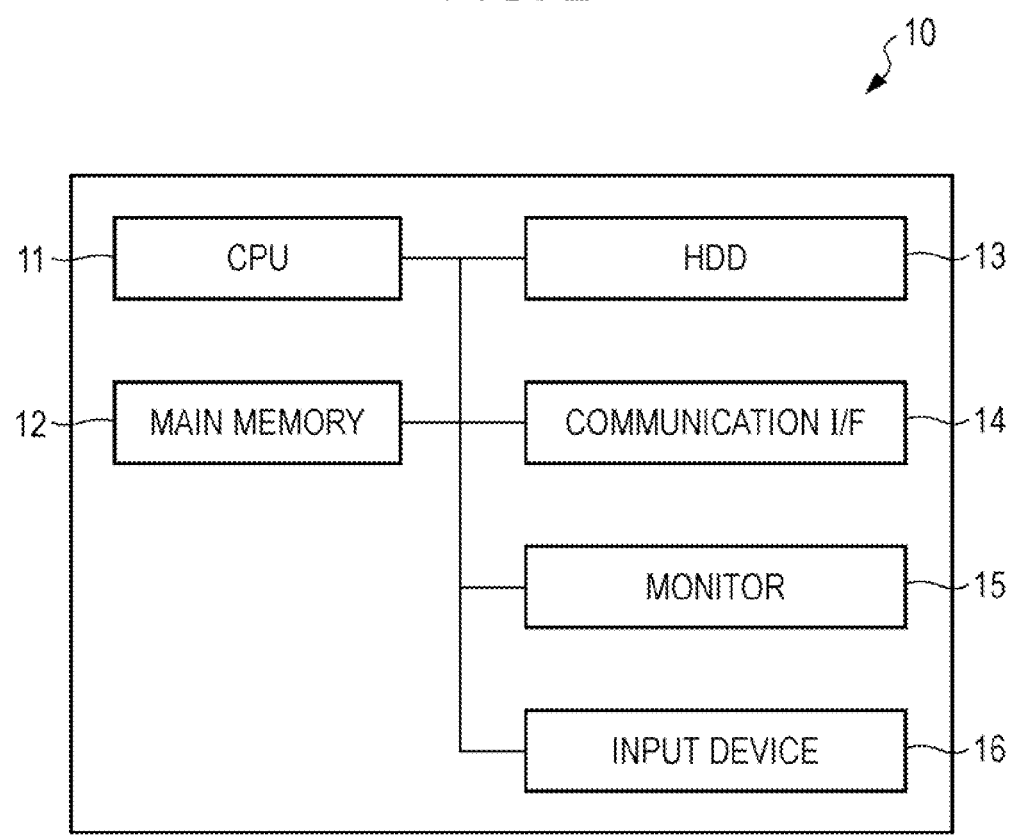
FIG. 2 illustrates an example of the hardware configuration of a terminal apparatus.

The terminal apparatus 10 includes, as shown in FIG. 2, a central processing unit (CPU) 11, which is an arithmetic unit, a main memory 12, which is a storage device, and a hard disk drive (HDD) 13. The CPU 11 executes various software programs, such as an operating system (OS) and applications. The main memory 12 is a storage region that stores therein various software programs and data used for executing the software programs. The HDD 13 is a storage region that stores therein input data which is input into various software programs and output data which is output from various software programs.

The terminal apparatus 10 also includes a communication interface (hereinafter referred, to as a "communication I/F")

14 through which the terminal apparatus 10 performs communication with an external source, a monitor 15, which is an example of an image display apparatus, including a video memory or a display, and an input device 16, such as a keyboard or a mouse.

A brief description will be given of an operation performed by the image adjusting system 1 with reference to the flowchart of FIG. 3.

The operation of the image adjusting system 1 will be described below, assuming that an administrator who performs image adjustment of the monitor 15 of the terminal apparatus 10 adjusts the color of the monitor 15 in accordance with the color of the projector 20.

First, in step S101, the administrator displays a white image on the projector 20 and obtains the color temperature of the white image by using a colorimeter and sets the obtained color temperature as a set color temperature.

Then, in step S102, the administrator also displays a white image on the monitor 15 and obtains predetermined device characteristic data by using the colorimeter.

Then, in step S103, the administrator inputs the color temperature of the white image displayed on the projector 20 and the device characteristic data of the monitor 15 into image adjusting software to be executed in the terminal apparatus 10, and then, the image adjusting software adjusts a color temperature at which an image is displayed on the monitor 15 to the color temperature (set color temperature) at which an image is displayed on the projector 20.

In this manner, the administrator adjusts the color temperature of the monitor 15 to the color temperature of the projector 20. This makes it possible to adjust the color of an image displayed on the monitor 15 to the color of an image displayed on the projector 20. This adjustment is performed because the color temperature greatly matters for a viewer to visually recognize the color of an image displayed on the projector 20 or the monitor 15.

The image adjusting system 1 may be used, for example, for the following occasion. When a meeting takes place by using the projector 20, participants may wish to see an image displayed on the monitor 15 close to an image displayed on the monitor 15. Or, though it is different from the above-described exemplary embodiment, in a multi-screen video display system in which plural monitors are combined and displayed as a single monitor, if the colors of the individual monitors do not match one another, an image displayed on the display system looks unnatural. Accordingly, it is necessary to perform the above-described image adjustment in each monitor.

Figure 3:
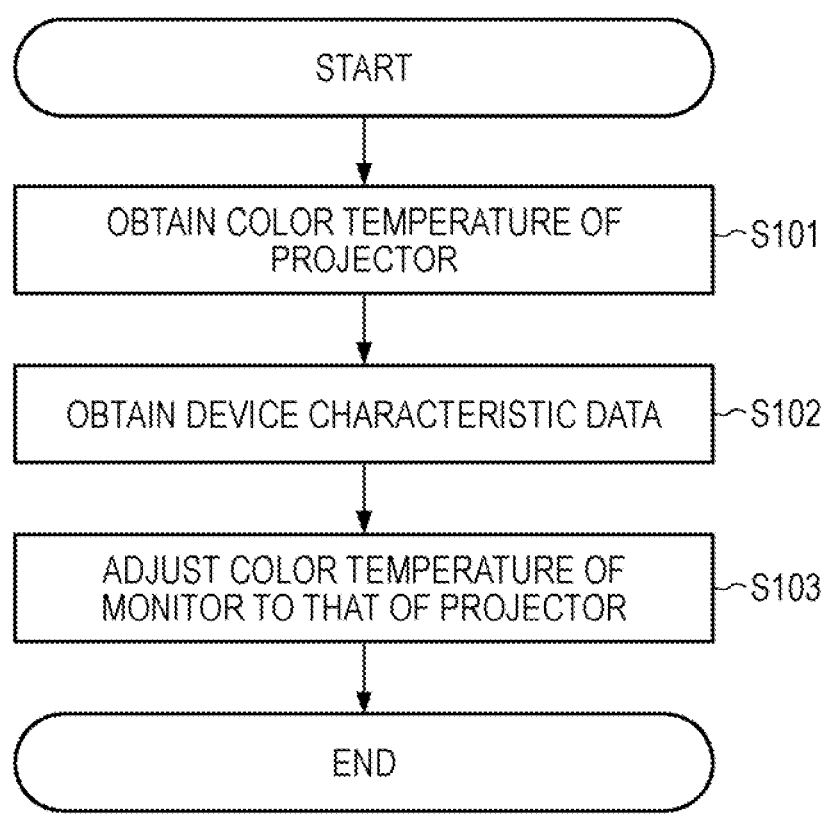
FIG. 3 is a flowchart illustrating an operation performed by an image adjusting system.

In the example indicated by the flowchart of FIG. 3, the administrator measures the color temperature of a white image displayed on the projector 20, and then adjusts the color temperature of an image displayed on the monitor 15. Alternatively, the administrator may directly input a predetermined set color temperature into image adjusting software that is executed by the terminal apparatus 10, and then, may adjust the color temperature of an image displayed on the monitor 15 to the set color temperature. The set color temperature is a temperature which was set when a manufacturer manufactured the projector 20, and the administrator may obtain this set color temperature by referring to, for example, specifications of the projector 20.

FIGS. 4A through 4C are examples of calculations carried out when adjusting the color temperature of an image displayed on the monitor 15 in step S103.

FIG. 4A illustrates an example in which the color temperature of a white image displayed on the projector 20 is 6500 K and the associated color is represented by (X, Y, Z)=(95.04, 100, 108.9) in the XYZ colorimetric system. When the color temperature is 6500 K, X and Z are uniquely determined, but Y (luminance; may take various values. In this example, Y is 100, which has been selected by considering a situation in which a white image is displayed on the monitor 15. That is, when a white image is displayed on the monitor 15, Y takes a value around 100.

FIG. 4B illustrates device characteristic data. The device characteristic data includes color values obtained when a white image is displayed on the monitor 15, tone values of red (R), green (G), and blue (B), which are reference colors, obtained when a white image is displayed, and a tone characteristic (gamma (γ) value) of the monitor 15. In FIG. 4B, the color values of a white image displayed on the monitor 15 are (X, Y, Z)=(92.0, 102.5, 118.0). Generally, the tone values of the reference colors obtained when a white image is displayed on the monitor 15 are the greatest values that can be taken in the monitor 15. That is, when each of R, G, B colors is displayed on the monitor 15 in 256 levels, it may take any value from 0 to 255. However, when a white image is displayed in a normal state, the tone values of R, G, and B take maximum tone values, i.e., (R, G, B)=(255, 255, 255).

Figure 5:
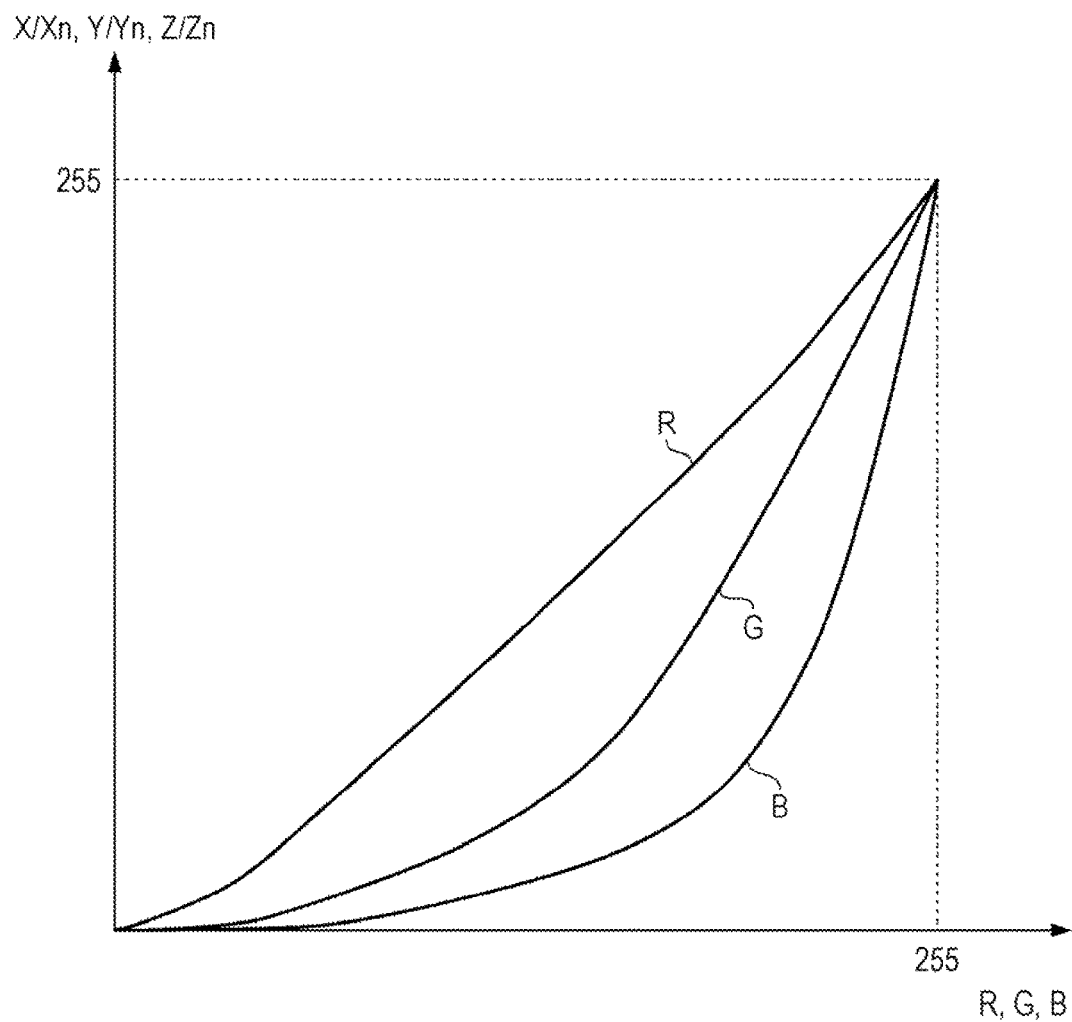
FIG. 5 illustrates tone curves of R, G, and B in a case where tone characteristics are different among R, G, and B.

Generally, the tone characteristic (γ) of the monitor 15 is set to be 2.2. However, this is only an example. The tone characteristic may be a characteristic that is not possible to represent by using the gamma value, or the tone characteristics of R, G, and B may be different. For example, the gamma value may be different among R, G, and B, such as concerning R, γ=1.8, concerning G, γ=2.2, and concerning B, γ=2.6. FIG. 5 illustrates such a case in which tone carves indicating the tone characteristics are different among R, G, and B.

Under the above-described conditions, in order to set the color temperature of the monitor 15 to 6500 K, a set of tone values of R, G, and B may be calculated by using the following transform equation (A).

$$\begin{bmatrix} R \\ G \\ B \end{bmatrix} = \begin{bmatrix} X_R & X_G & X_B \\ Y_R & Y_G & Y_B \\ Z_R & Z_G & Z_B \end{bmatrix}^{-1} \begin{bmatrix} X \\ Y \\ Z \end{bmatrix} \quad (A)$$

In equation (A), $X_R$, $X_G$, $X_B$, $Y_R$, $Y_G$, $Y_B$, $Z_R$, $Z_G$, and $Z_B$ are found on the basis of (X, Y, Z) which are measured when displaying single color images of R, G, and B on the monitor 15. Alternatively, values defined by the International Color Consortium (ICC) profile, which are provided by the manufacturer of the monitor 15, may be used.

However, the transform precision may not be sufficient by the above-described method, in which case, the following approaches, for example, may be taken.

(1) A set of tone values of R, G, and B obtained when the color values of a white image displayed on the projector 20 (X, Y, Z)=(95.04, 100, 108.9) is searched for.

(2) A set of tone values of R, G, and B obtained when the proportion of X, Y, and Z (X, Y, Z)=(95.04, 100, 108.9) is searched for.

(3) A set of tone values of R, G, and B that can reproduce an X, Y, and Z proportion among which the proportion made up of Y has the highest value and that is obtained when the color temperature is 6500 K is searched for.

In the approach (1), a measurement patch is displayed on the monitor 15 by changing tone values of the reference colors, i.e., R, G, and B, and while changing the tone values of the measurement patch, the color values of the measurement patch are measured. In this case, measurements are started by setting the tone values of R, G, and B of the measurement patch to (255, 255, 255), and measurements are carried out by sequentially decreasing at least one of the tone values. Then, a measurement result indicating (X, Y, Z)=(95.04, 100, 108.9) is searched for from among plural measurement results. If such a measurement result is found, the tone values of the reference colors R, G, and B obtained when (X, Y, Z)=(95.04, 100, 108.9) are set to be the maximum tone values of R, G, and B corresponding to the changed color temperature.

In the approach (3), the X, Y, and Z proportion (X, Y, Z)=(95.04, 100, 108.9) is searched for from among measurement results in a manner similar to the approach (1), and the tone values of the reference colors R, G, and B obtained when (X, Y, Z)=(95.04, 100, 108.9) are set to be the maximum tone values of R, G, and B corresponding to the changed color temperature.

In the approach (3), a measurement patch in which tone values of R, G, and B have been reduced to certain values is displayed on the monitor 15, and then, the color values of the measurement patch are measured while sequentially decreasing the tone values. Then, a measurement result indicating the X, Y, and Z proportion (X, Y, Z)=(95.04, 100, 108.9) is searched for from among plural measurement results. Then, if a set of the tone values of the reference colors R, G, and B obtained when (X, Y, Z)=(95.04, 100, 108.9) is found, a determination is further made regarding whether the tone values of R, G, and B include 255. If the tone values include 255, they are set to foe the maximum tone values of R, G, and B corresponding to the changed color temperature. If the tone values does not include 255, the tone values of R, G, and B of the measurement patch are increased as a whole, and then, a measurement result indicating the X, Y, and Z proportion (X, Y, Z)=(95.04, 100, 108.9) is searched for from among plural measurement results. As a result, a set of tone values of R, G, and B that can reproduce an X, Y, and Z proportion among which the proportion made up of Y has the highest value is set to be a set of the maximum tone values of R, G, and B corresponding to the changed color temperature.

That is, in this exemplary embodiment, the X, Y, and Z proportion (X, Y, Z) to be obtained when a white image displayed on the monitor 15 is changed to a white image corresponding to a set color temperature is searched for, on the basis of the color values of a white image displayed on the projector 20 and the maximum tone values of the reference colors R, G, and B. Then, the maximum tone values of the reference colors R, G and B to be obtained when X, Y, and Z proportion (X, Y, Z) takes the searched color values are calculated.

FIG. 4C illustrates an example of the calculated maximum tone values of the reference colors R, G, and B. In this example, the maximum tone values of the reference colors R, G, and B of a white image obtained before the color temperature is changed is (R, G, B)=(255, 255, 255), and if the maximum tone values are changed to (R, G, B)=(200, 224, 255), a white image having a color temperature of 6500 K is obtained.

Figure 6:
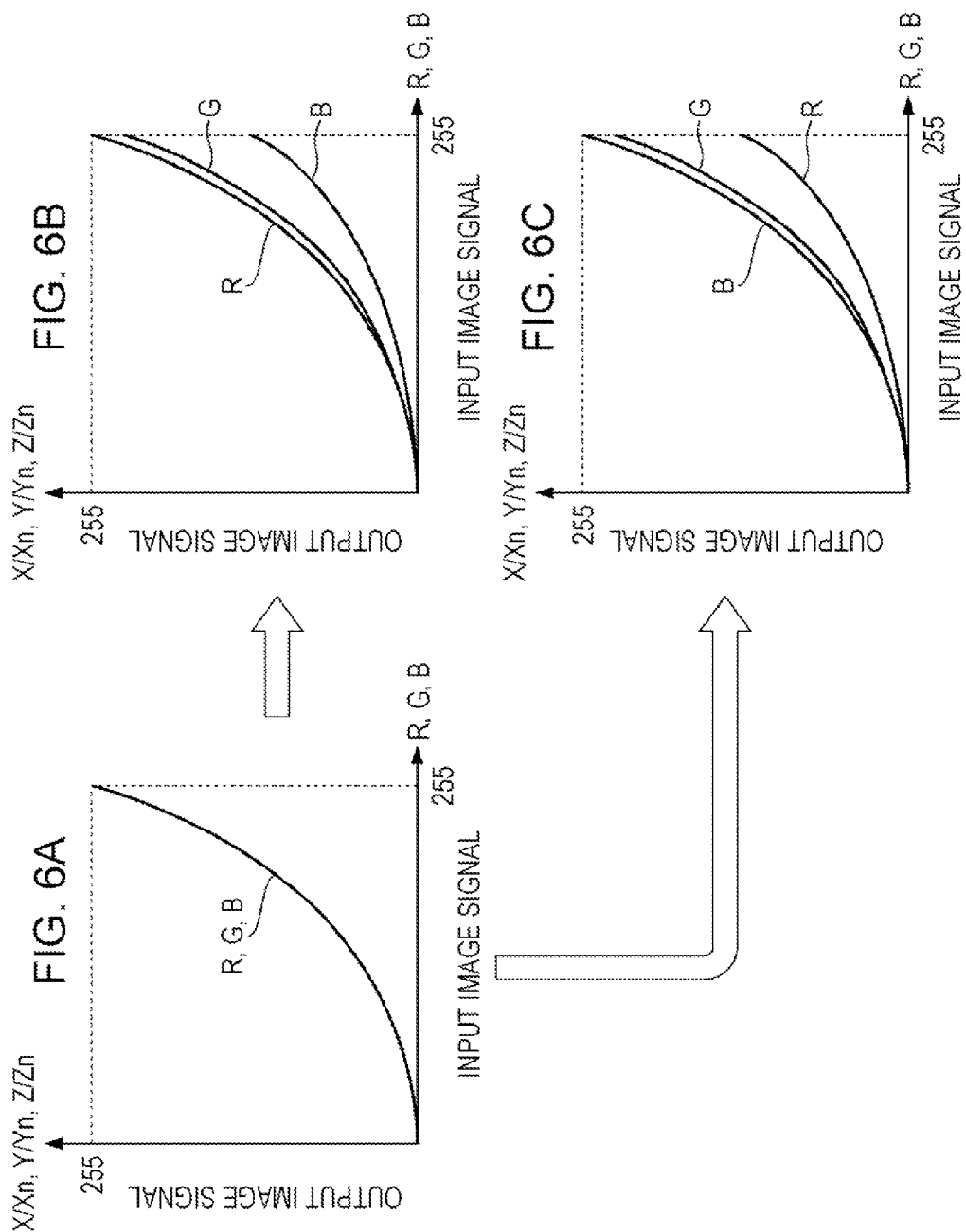
FIG. 6A illustrates a tone curve representing tone characteristics of R, G, and B obtained before the color temperature is changed.
FIGS. 6B and 6C illustrate tone curves representing tone characteristics of R, G, and B obtained after the color temperature is changed.

FIGS. 6A through 6C illustrate tone curves representing tone characteristics of the reference colors R, G, and B, and more specifically. FIG. 6A illustrates tone curves obtained before the color temperature is changed, and FIGS. 6B and 6C illustrate tone curves obtained after the color temperature is changed. In FIGS. 6A through 6C, the horizontal axis indicates the tone value of an input image signal, and the vertical axis indicates the tone value of an output image signal.

FIG. 6A illustrates tone curves of the reference colors R, G, and B obtained, before the color temperature of the monitor 15 is changed. In this example, it is seen that, when the maximum tone values of the reference colors R, G, and B are (R, G, B)=(255, 255, 255), the three colors R, G, and B are represented by similar tone curves, assuming that the tone characteristics γ of the reference colors R, G, and B are the same, such as 2.2.

FIG. 6B illustrates tone curves of the reference colors R, G, and B obtained when the color temperature of the monitor 15 is changed to 4000 K. In this case, the color temperature of the monitor 15 is decreased. Among the tone curves concerning R, G, and B, there is no change in the tone curve concerning R. In contrast, the maximum value of the tone curve concerning B is sharply dropped. The reason for this is as follows. When the color temperature is decreased, the color of a white image is supposed to become more reddish. Accordingly, the tone curve concerning B is decreased to a lower level than the tone curve concerning R, so that R emits light more intensely than B.

FIG. 6C illustrates tone curves of the reference colors R, G, and B obtained when the color temperature of the monitor 15 is increased to 9300 K. In this case, the color temperature of the monitor 15 is increased. Among the tone curves concerning R, G, and B, there is no change in the tons curve concerning B. In contrast, the maximum value of the tone curve concerning R is sharply dropped. The reason for this is as follows. When the color temperature is increased, the color or a white image is supposed to become more bluish. Accordingly, in contrast to the case of FIG. 6B, the tone curve concerning R is decreased to a lower level than the tone curve concerning B, so that B emit light more intensely than R.

As stated above, if the tone characteristic γ obtained before the color temperature is changed is not 2.2, or if it is not possible to represent the tone characteristic by the gamma value, or if the gamma values are different among R, G, and B, it is preferable that the tone characteristics are also corrected when changing the color temperature. In this exemplary embodiment, the tone characteristics of all the R, G, and B colors are corrected to 2.2.

In this manner, the color temperature can be changed by decreasing at least one of the tone curves concerning R, G, and B. That is, the tone curve is set such that the maximum tone value of the output image signal becomes slightly smaller than obtained before the color temperature is changed. However, if the maximum tone value is decreased, the number of tone levels of the output image signal is also decreased. This phenomenon is more noticeable particularly in a low brightness region in which the tone value of the output image signal is small.

Figure 7:
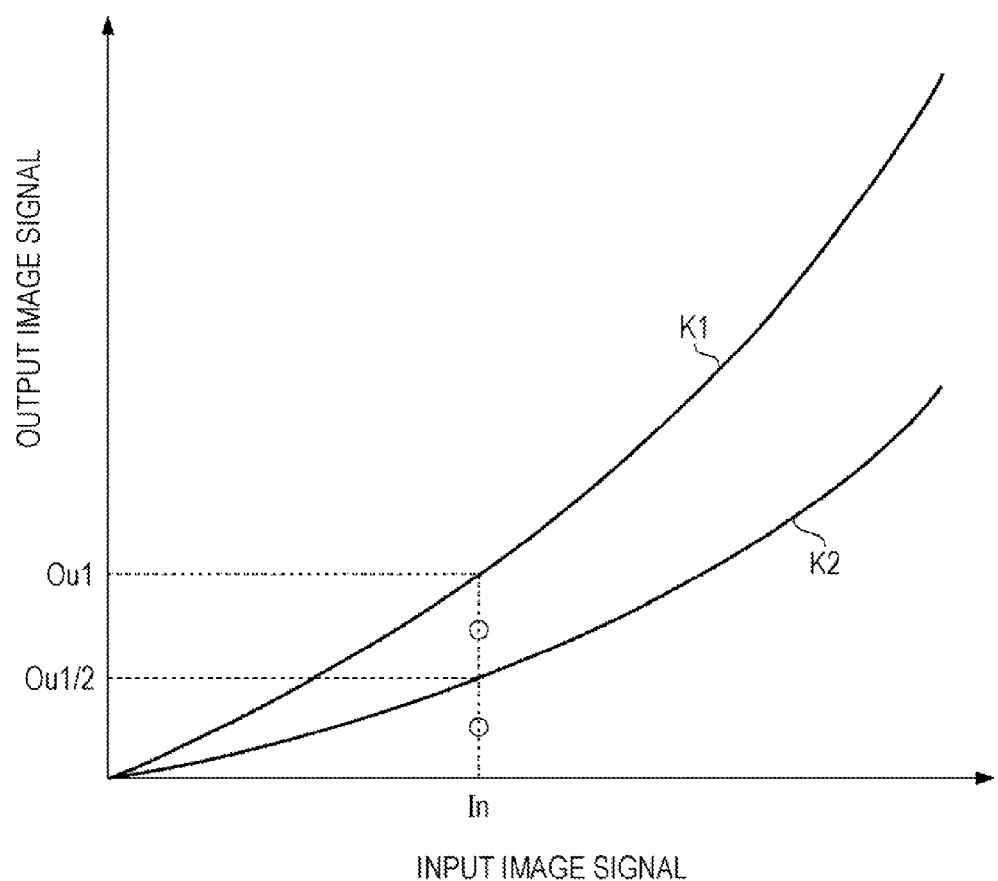
FIG. 7 illustrates a phenomenon occurring in a low brightness region of an output image signal caused by a decreased maximum tone value.

FIG. 7 illustrates a phenomenon occurring in a low brightness region of the output image signal caused by a decreased maximum tone value.

FIG. 7 is an enlarged diagram illustrating a low brightness region of a tone curve obtained before the color temperature is changed and a tone curve obtained after the color temperature is changed. The tone curve K1 is a tone curve obtained before the color temperature is changed, while the tone curve K2 is a tone curve obtained after the color temperature is changed. When the tone value of the input image signal is In, the tone value of the output image signal of the tone curve K1 is Ou1, while the tone value of the output image signal of the tone curve K2 is reduced to Ou1/2, which is half of Ou1. That is, in the low brightness region in which the tone value is In, the number of tone levels is reduced by half after the color temperature is changed.

In this manner, if the number of tone levels in a low brightness region of an output image signal is decreased, it is difficult to express a tone of a color closer to black. More specifically, even if there is a difference in tone levels in an input image signal, such a difference is lost when an image is displayed on the monitor 15 (disappearance of tone levels), which may make the resulting image solid. These days, in computer graphics (CG), displaying of dark images is common, and if a difference in tone levels is lost and the resulting image becomes solid, it appears to a viewer that some tone levels are missing in the image.

This phenomenon is more likely to occur particularly when the tone characteristic γ is greater than 1. When the tone characteristic γ is greater than 1, the tone curve is formed, as shown in FIG. 7, as a convex downward, curve. Accordingly, the tone value of the output image signal is not significantly increased in accordance with an increase in the tone value of the input image signal. That is, in a low brightness region, the number of tone levels of the output image signal is originally small, and thus, the low brightness region is more susceptible to a decrease in the number of tone levels. It is therefore more likely that the disappearance of tone levels will occur, which makes the resulting image solid. In contrast, in a high brightness region, the tone value of the output image signal is significantly increased in accordance with an increase in the tone value of the input image signal. That is, in a high brightness region, the number of tone levels of the output image signal is originally large, and thus, the high brightness region is less susceptible to a decrease in the number of tone levels. It is therefore less likely that the disappearance of tone levels will occur, which reduces the possibility of the resulting image becoming solid.

In view of the above-described background, in this exemplary embodiment, an image adjusting apparatus 100 is provided in the terminal apparatus 10, and the tone characteristics are changed in the image adjusting apparatus 100, thereby reducing the occurrence of the above-described phenomenon.

Figure 8:
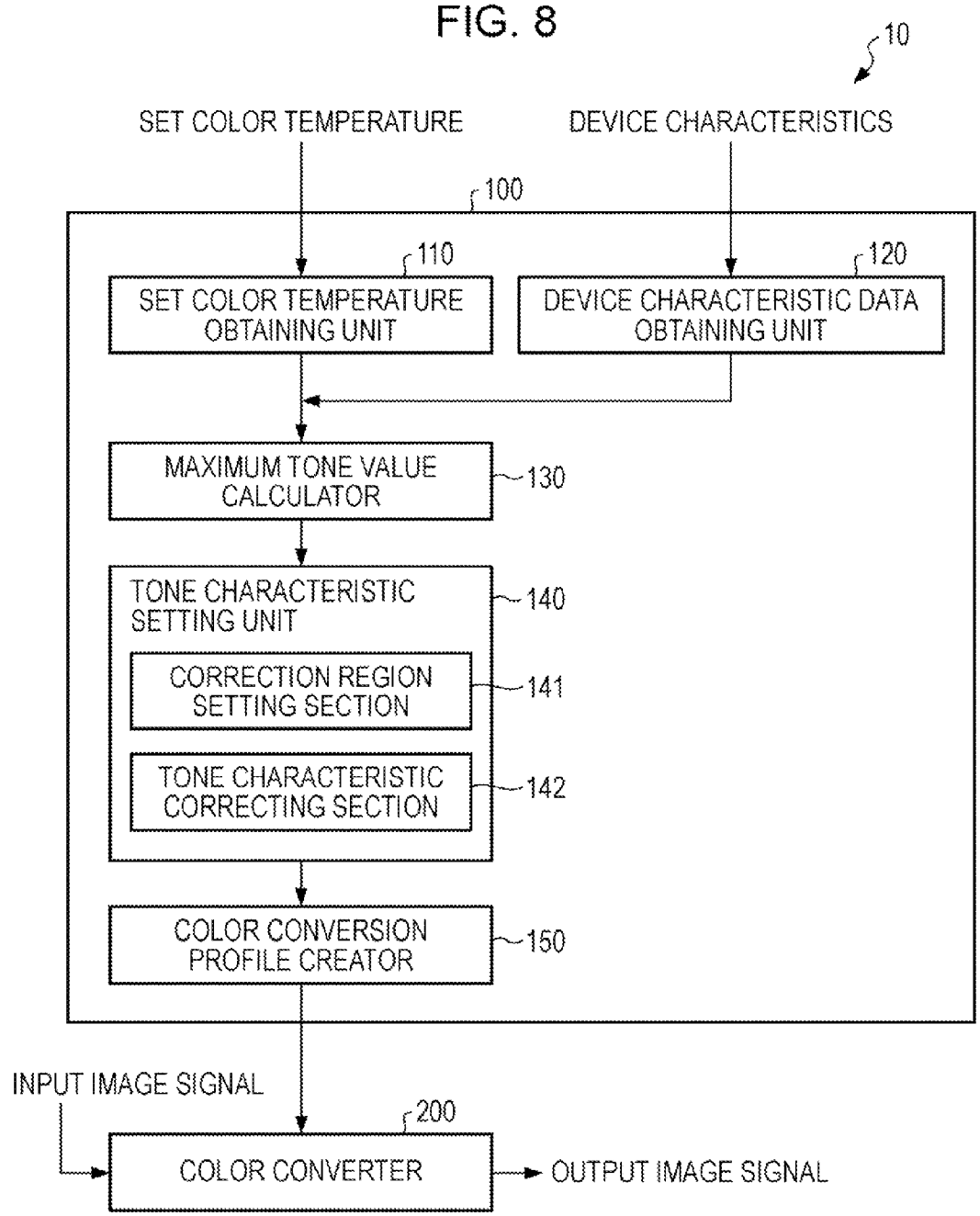
FIG. 8 illustrates an example of the functional configuration of an image adjusting apparatus according to an exemplary embodiment of the invention.

FIG. 8 illustrates the functional configuration of the image adjusting apparatus 100 according to this exemplary embodiment.

The image adjusting apparatus 100 includes, as shown in FIG. 8, a set color temperature obtaining unit 110, a device characteristic data obtaining unit 120, a maximum tone value calculator 130, a tone characteristic setting unit 140, and a color conversion profile creator 150. The tone characteristic setting unit 140 includes a correction region setting section 141 and a tone characteristic correcting section 142. In FIG. 8, a color converter 200 is also shown, though it does not form the image adjusting apparatus 100. The color converter 200 converts an input image signal into an output image signal by using a color conversion profile created in the color conversion profile creator 150 of the image adjusting apparatus 100, On the monitor 15, an image is displayed on the basis of an output image signal obtained by converting the tone of an input image signal in accordance with predetermined tone characteristics. The set color temperature obtaining unit 110 obtains a set color temperature which is set as a color temperature when a white image is displayed on the monitor 15. The set color temperature is the set color temperature obtained in step S101 of FIG. 3, and is obtained by measuring a white image displayed on the projector 20. The set color temperature may be input by, for example, an administrator performing image adjustment of the terminal apparatus 10 by using the input device 16.

The device characteristic data obtaining unit 120, which is an example of a characteristic value information obtaining unit, obtains device characteristic data of the monitor 15. More specifically, the device characteristic data of the monitor 15 includes color values obtained when a white image is displayed on the monitor 15, the maximum tone values of reference colors R, G, and B obtained when a white image is displayed on the monitor 15, and tone characteristic (γ) of the monitor 15, which have been discussed with reference to FIG. 4B. As discussed with reference to FIG. 4B, in this exemplary embodiment, the maximum tone values of the reference colors are (R, G, B)=(255, 255, 255), and the tone characteristic, e.g., γ=2.2. In this exemplary embodiment, the device characteristic data of the monitor 15 is obtained from the outside of the image adjusting apparatus 100. However, a storage unit may be provided within the image adjusting apparatus 100, and the device characteristic data of the monitor 15 may be stored in the storage unit in advance.

The maximum tone value calculator 130 calculates maximum tone values of the reference colors obtained when a white image displayed on the monitor 15 is converted into a white image corresponding to the set color temperature obtained by the set color temperature obtaining unit 110. More specifically, as discussed with reference to FIGS. 4A through 4C, a set of new color values (X, Y, Z) to be obtained when the color temperature of the monitor 15 is changed to the set color temperature is calculated, on the basis of the color value (X, Y, Z) of a white image displayed on the monitor 15 before the color temperature is changed and the color value (X, Y, Z) of a white image corresponding to the set color temperature. Then, the maximum tone values of the reference colors R, G, and B that implement the set of new color values (X, Y, Z) are calculated. As discussed with reference to FIGS. 6A through 6C, at least one of the calculated tone values is smaller than the associated tone value of the original tone values (R, G, B)=(255, 255, 255). In the example shown in FIG. 4C, the calculated maximum tone values of R, G, and B are (R, G, B)=(200, 224, 255). That is, the maximum tone value calculator 130 calculates maximum tone values of the reference colors to be obtained when the white image displayed on the monitor 15 is changed to a white image corresponding to the set color temperature, on the basis of the color values of the white image obtained by the device characteristic data obtaining unit 120 and the color values corresponding to the set color temperature.

The tone characteristic setting unit 140 sets tone characteristics of the reference colors corresponding to the set color temperature, on the basis of the maximum tone values of the reference colors calculated by the maximum tone value calculator 130. When setting the tone characteristics of the reference colors, if the maximum tone values of the reference colors calculated by the maximum tone value calculator 130 are decreased from those obtained before the set color temperature is set, the tone characteristic setting unit 140 corrects the tone characteristics so chat, in a region in which the tone value of an input image signal is equal to or smaller than a predetermined value, the tone value of an output image signal is increased.

The color conversion profile creator 150 creates a color conversion profile that converts an input image signal into an output image signal by using the tone characteristics set by the tone characteristic setting unit 140. The color conversion profile will be discussed in detail later.

The functions of the tone characteristic setting unit 140 will be discussed in detail below.

Figure 9:
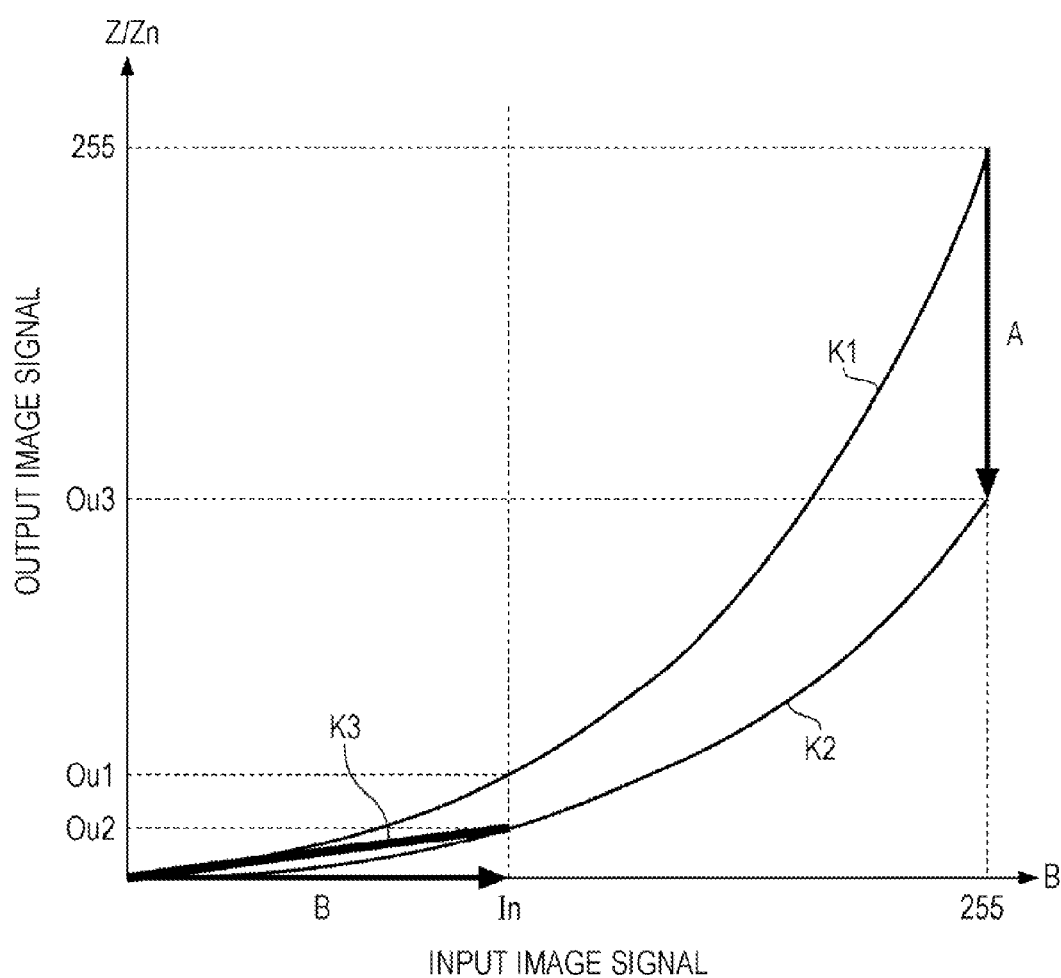
FIG. 9 illustrates an example of a tone curve set by a tone characteristic setting unit.

FIG. 9 illustrates a tone curve set by the tone characteristic setting unit 140.

The tone curve K1 is a tone curve obtained before the color temperature is changed. The tone curve K2 is a tone curve obtained after the color temperature is changed. In the example shown in FIG. 9, the tone curve concerning B has been changed. When the color temperature is changed, the maximum tone value of B is reduced from 255 to Ou3. when the tone value of the input image signal is In, the tone value of the output image signal is reduced from Ou1 to Ou2. In this exemplary embodiment, therefore, in a low brightness region, the tone curve obtained after changing the color temperature is corrected to a linear curve. More specifically, the origin and the point (In, Ou2) are connected with a straight line, and this straight line is set to be a tone curve K3 in a region in which the tone value of the input image signal is equal to in or smaller. The portion of the tone curve K2 in a region in which the tone value of the input signal is greater than In is not corrected.

In this manner, in this exemplary embodiment, in a low brightness region in which the tone value of an input image signal is equal to or smaller than a predetermined value (in this example, a region in which the tone value of the input image signal is equal to or smaller than In), tone characteristics are corrected so that the tone value of an output image signal is increased. In other words, in a region in which the tone value of an input image signal is equal to or smaller than the predetermined value, the tone characteristics are corrected so that the brightness of the output image signal is increased.

With this correction, in a low brightness region exhibiting a color close to black, it is less susceptible to a decrease in the number of tone levels. Accordingly, it is less likely that the disappearance of tone levels will, occur, which reduces the possibility of the resulting image becoming solid. As a result, it does not appear to a viewer that some tone levels are missing in the image displayed on the monitor 15.

In this exemplary embodiment, it is preferable that a range of a region in which the tone characteristics will be corrected (seen a region will be called a "correction region") is changed in accordance with a decrease in the maximum tone value caused by a change in the color temperature. That is, as a decrease in the maximum tone value caused by a change in the color temperature is greater, a greater number of tone levels are reduced, not only in a low brightness region, but also in a higher brightness region. Accordingly, as a decrease in the maximum tone value is smaller, a smaller region is set as the correction region, and as a decrease in the maximum tone value is larger, the correction region is enlarged to a higher brightness region, and a larger region is set as the correction region. In the example shown in FIG. 9, a decrease in the maximum tone value is indicated by the arrow A, and more specifically, by an amount (255-Ou3). As a decrease in the maximum tone value is greater, the length of the arrow B indicating a correction, region is increased. More specifically, the amount of In is increased.

As a more specific approach to determining a correction region in this exemplary embodiment, the number of tone levels in a correction region may be set to be the same as that indicated by a decrease in the maximum tone value. In the example shown in FIG. 9, the maximum tone value is decreased by an amount (255-Ou3), and thus, the value of In is set to be (255-Ou3).

Alternatively, a region in which the number of tone levels of the output image signal corresponding to the changed color temperature is reduced to half or smaller than that obtained before the color temperature is changed may be set as a correction region. In the example shown in FIG. 9, a region in which Ou2 is equal to or smaller than Ou1/2 may be set as a correction region.

Figure 10:
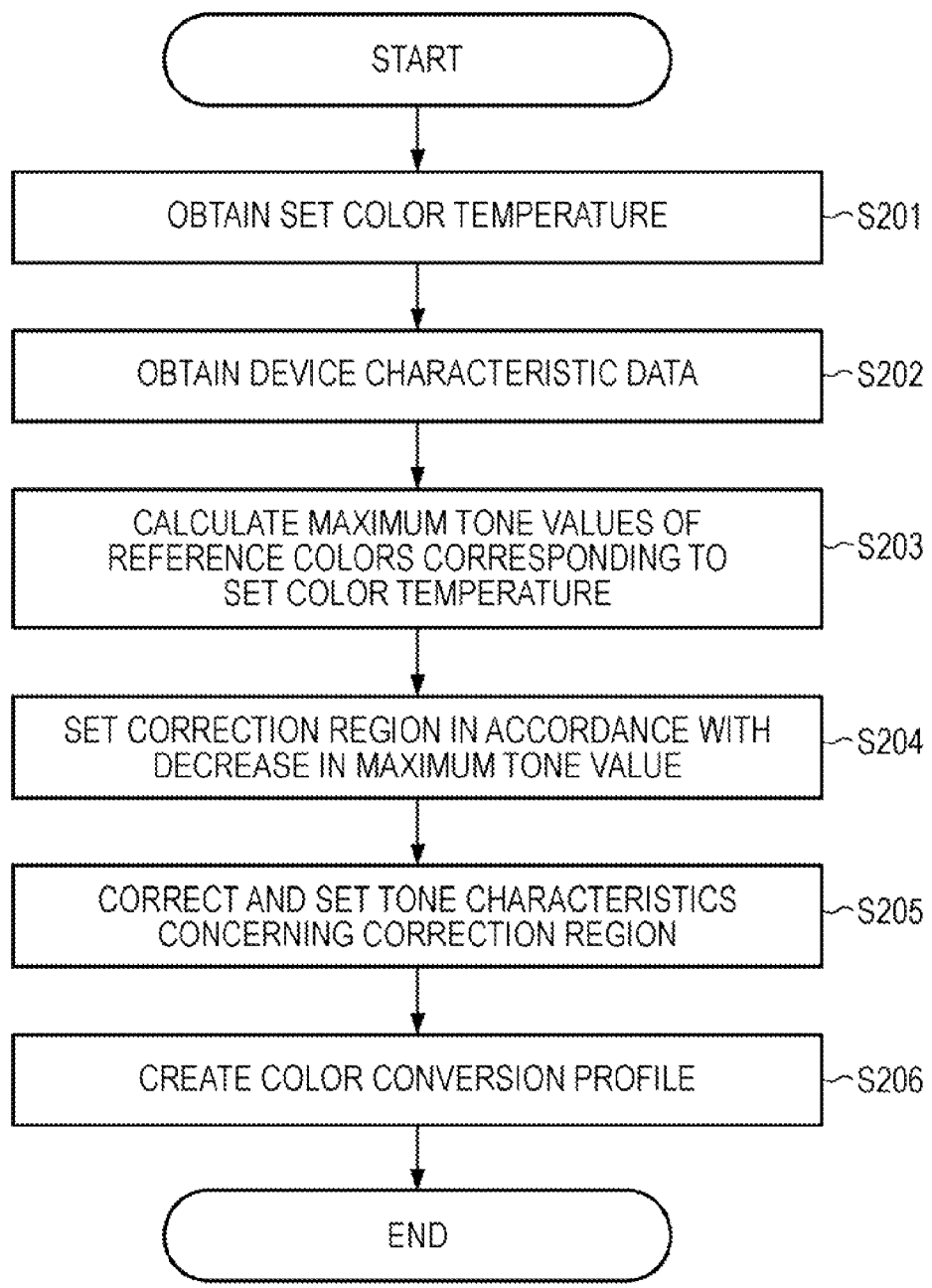
FIG. 10 is a flowchart illustrating an operation performed by an image adjusting apparatus.

An operation performed by the image adjusting apparatus 100 will be described below with reference to FIG. 9 and the flowchart of FIG. 10.

In step S201, the set color temperature obtaining unit 110 first obtains a set color temperature. Then, in step S202, the device characteristic data obtaining unit 120 obtains device characteristic data, such as color values measured when a white image is displayed on the monitor 15, tons values of the reference colors R, G, and B (normally, all 255) obtained when a white image is displayed on the monitor 15, and tone characteristic (e.g., $\gamma=2.2$) of the monitor 15. Then, in step S203, the maximum tone value calculator 130 calculates maximum tone values to be obtained when a white image on the monitor 15 is changed to a white image corresponding to the set color temperature obtained by the set color temperature obtaining unit 110.

In step S204, if the maximum tone value of a reference color calculated by the maximum tone value calculator 130 is smaller than that which has been obtained before the color temperature is set, the tone characteristic setting unit 140 corrects tone characteristics of this reference color. First, the correction region setting section 141 sets a correction region in accordance with a decrease in the maximum tone value. Then, in step S205, the tone characteristic correcting section 142 corrects tone characteristics in the correction region set by the correction region setting section 141 so that the tone value of the output image signal is increased. If the tone characteristic $\gamma$ obtained before the color temperature is changed is not 2.2, it may be set to 2.2, and then, steps S204 and S205 may be executed.

Then, in step S206, the color conversion profile creator 150 creates a color conversion profile that reflects the tone characteristics set by the tone characteristic setting unit 140.

The color conversion profile created in the above-described process is used for converting the input image signal into an output image signal in the color converter 200.

In the above-described example, when a decrease in the maximum tone value caused by a change in the color temperature reaches a predetermined threshold, a tone curve may be corrected. That is, if the difference between the maximum tone value before the color temperature is changed and that after the color temperature is changed is very small, i.e., if a change in the tone curve is very small, it is less likely that the number of tone levels in a low brightness region will be decreased. Accordingly, if a decrease in the maximum tone value is less than the predetermined threshold, the tone curve may not be corrected. If a decrease in the maximum tone value is equal to or more than the predetermined threshold, the tone curve may be corrected.

Alternatively, when the difference between the minimum luminance and the maximum luminance (contrast difference) of the monitor 15 corresponding to the changed color temperature is equal to or smaller than a predetermined threshold, the tone curve may be corrected. That is, when the contrast difference is large, even if the number of tone levels in a low brightness region is decreased and the resulting image becomes solid, such a phenomenon is less noticeable. Accordingly, when the contrast difference of the monitor 15 corresponding to the changed color temperature exceeds the predetermined threshold, the tone curve may not be corrected. When the contrast difference is equal to or smaller than the predetermined threshold, the tone curve may be corrected.

In the above-described example, an image displayed on the monitor 15 is adjusted in accordance with the color temperature of an image displayed on the projector 20. However, in accordance with the color temperature of an image displayed on a certain monitor 15, an image displayed on another monitor 15 or on the projector 20 may be adjusted.

Additionally, an administrator may determine a set color temperature and may adjust an image displayed on the monitor 15 or the projector 20 in accordance with the set color temperature.

In this case, a color temperature close to that of a color of a sheet on which an image displayed on the monitor 15 is printed may be set as the set color temperature. With this setting, the color of an image displayed on the monitor 15 becomes close to that of a sheet on which the image is printed.

Alternatively, the color temperature may be adjusted to that of illumination. If a fluorescent lamp is utilized as illumination, normally, the color temperature is indicated in the fluorescent lamp itself or in a catalog of the fluorescent lamp. In this case, too, the color of an image displayed on the monitor 15 becomes close to that of a sheet on which the image is printed.

In the above-describe example, plural devices, such as the projector 20 and the monitor 15, are provided, and an image displayed on the monitor 15 or the projector 20 is adjusted. However, only one device, such as the monitor 15 or the projector 20, may be provided, and an image displayed on such a single device may he adjusted. In this case, the administrator may set a set color temperature of the single device, such as the projector 20 or the monitor 15, regardless of whether the single device is connected to the network 30, and may adjust an image displayed on the single device in accordance with the set color temperature. In this case, in the flowchart of FIG. 3, step S101 is not necessary, and after the device characteristics are obtained in step S102, the color temperature of the monitor 15 is adjusted to the set color temperature set by the administrator in step S103.

Figure 11:
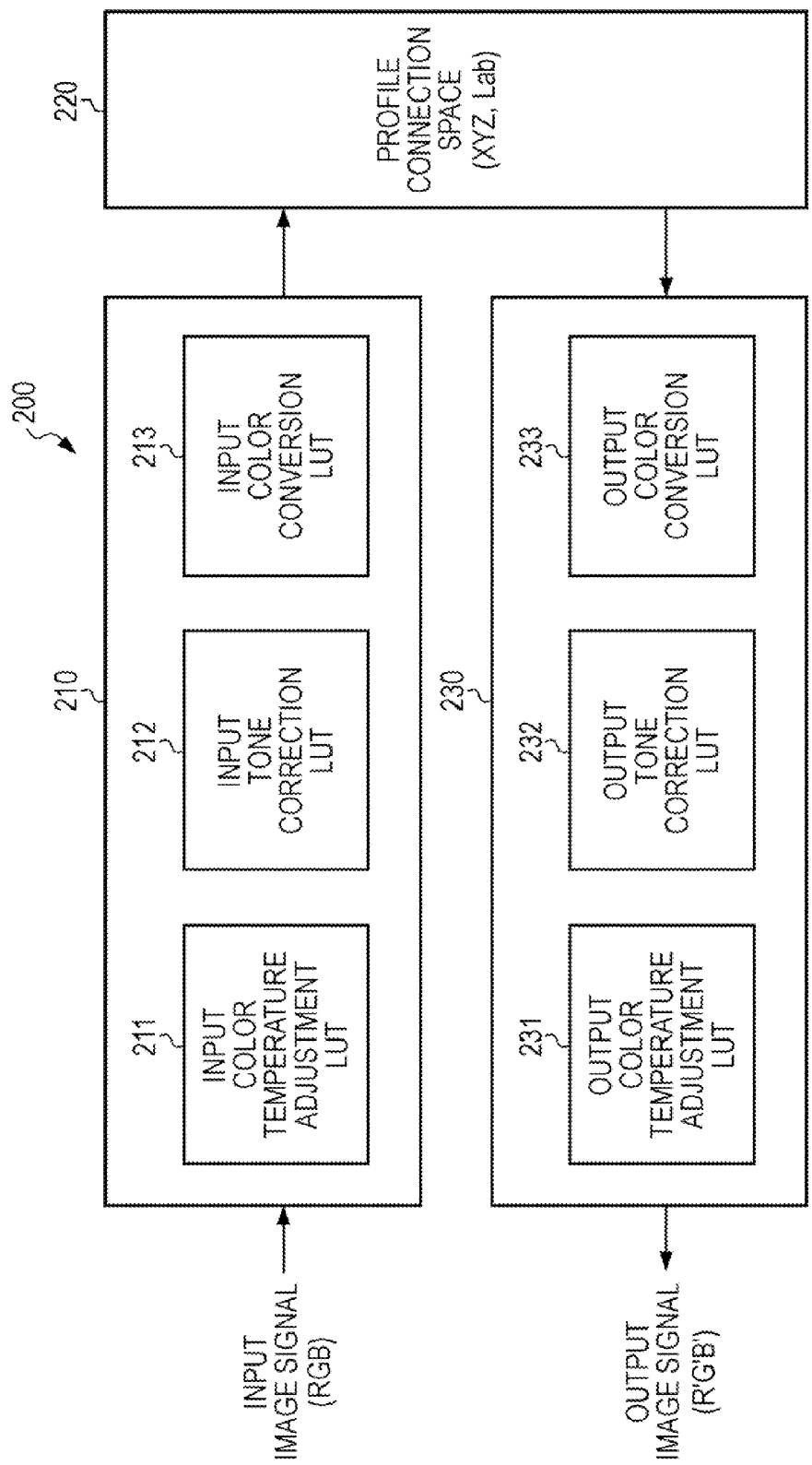
FIG. 11 illustrates a color converter.

FIG. 11 illustrates the color converter 200.

The color converter 200 includes, as shown in FIG. 11, a profile connection space (PCS) 220, an input image signal converter 210 that converts an input image signal into color values in the PCS 220, and an output image signal converter 230 that converts the color values in the PCS 220 into an output image signal.

The input image signal indicates color values in a color space dependent on a predetermined device. These color values are converted into color values in the PCS 220, which is a device-independent color space, by using the input image signal converter 210. Then, the color values in the PCS 220 are converted into color values in a color space dependent on the monitor 15 by using the output image signal converter 230. The color values indicated by the input image signal and the output image signal are color values represented in, for example, the RGB colorimetric system. The color values in the PCS 220 are color values represented in, for example, the XYZ colorimetric system or the L*a*b* colorimetric system.

The input image signal converter 210 includes, as shown in FIG. 11, an input color temperature adjustment look-up table (LUT) 211, an input tone correction LUT 212, and an input color conversion LUT 213. The input image signal converter 210 converts the input image signal into color values in a device-independent color space by using these LUTs.

The input color temperature adjustment LUT 211 changes the color temperature set in the input image signal into a predetermined color temperature. The input color temperature adjustment LUT 211 is formed in an LUT, which is, e.g., a linear table.

The input tone correction LUT 212 converts device-dependent tone characteristics of the input image signal into predetermined tone characteristics. The input tone correction LUT 212 is formed in an LUT, which is, e.g., a linear table.

The input color conversion LUT 213 converts the color values in the device-dependent color space into color values in the PCS 220, which is a device-independent color space. The input color conversion LUT 213 is formed in, e.g., a color conversion matrix or a direct LUT (DLUT), which is a multidimensional table.

The output image signal converter 230 includes, as shown in FIG. 11, an output color temperature adjustment LUT 231, an output tone correction PUT 232, and an output color conversion LUT 233. The output image signal converter 230 converts the color values in the PCS 220, which is a device-independent color space, into color values in a color space dependent on the monitor 15 by using these LUTs.

The output image signal converter 230 performs conversion of color signals in a direction opposite to the input image signal converter 210. More specifically, the output color conversion LUT 233 converts the color values in the PCS 220, which is a device-independent color space, into color values in a color space dependent on the monitor 15. The output tone correction LUT 232 converts predetermined tone characteristics into tone characteristics of the monitor 15. The output color temperature adjustment LUT 231 is an LUT in which tone characteristics corresponding to the changed color temperature are indicated. That is, the output color temperature adjustment LUT 231 reflects the tone characteristics generated by the image adjusting apparatus 100. The output color temperature adjustment LUT 231, the output tone correction LUT 232, and the output color conversion LUT 233 are formed in a manner similar to the counterparts of the input image signal converter 210. That is, the output color temperature adjustment LUT 231 and the output tone correction LUT 232 are formed in an LUT, which is a linear table, and the output color conversion LUT 233 is formed in DLUT, which is a multidimensional table.

The input color temperature adjustment LUT 211 and the output color temperature adjustment LUT 231 may be combined into a single LUT. The input tone correction LUT 212 and the input color conversion LUT 213 may be combined into one DLUT. The output tone correction LUT 232 and the output color conversion LUT 233 may be combined into a single DLUT.

Figure 12:
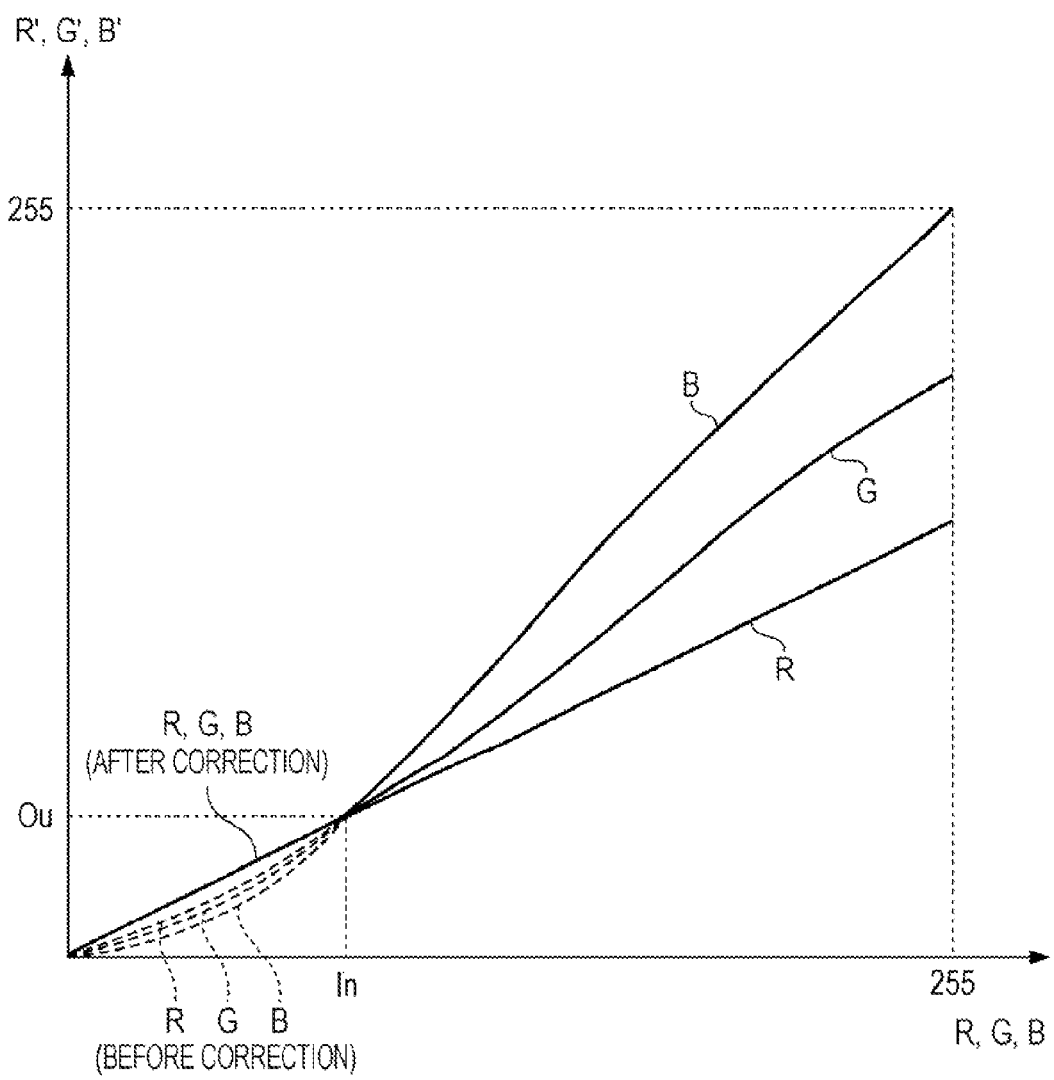
FIG. 12 illustrates a tone curve for converting tones R, G, and B into tones of R', G', and B', respectively.

Additionally, the output color temperature adjustment LUT 231 and the output tone correction LUT 232 may be combined into a single LUT. This combined LUT is an LUT indicating the relationship between the tone curve K2 and the tone curve K3 shown in FIG. 9. If the output color temperature adjustment LUT 231 and the output tone correction LUT 232 are used independently, the output color temperature adjustment LUT 231 may be an LUT indicating the relationship among tone curves, such as those shown in FIG. 12. The tone curves shown in FIG. 12 indicate that tones of R, G, and B are converted info tones of R', G', and B', respectively. As in the example shown in FIG. 9, in a region in which the tone value of the input image signal is equal to or smaller than a predetermined value In, tone characteristics are corrected so that the tone value of the output image signal is increased. In FIG. 12, in a region in which the tone values of the input image signal are equal to or smaller than the predetermined value In, tone curves indicated by the broken lines are corrected to a tone line indicated by the solid line. As a result of this correction, the tone curves are changed into a straight line in a low brightness region.

The output color temperature adjustment LUT 231 may be independently used outside the color converter 200. In this case, the function of the output color temperature adjustment LUT 231 may be integrated into a video card which will be built in the terminal apparatus 10, and then, control can be performed from the outside. If the monitor 15 has the function of performing color conversion by reading a color conversion table, the function of the output color temperature adjustment LUT 231 may be integrated into an output table of the monitor 15, which allows the monitor 15 to perform color processing.

In the above-described example shown in FIG. 9, the tone curve is corrected so that the tone curve K3 becomes linear in a correction region. However, this is only an example.

Figure 13A:
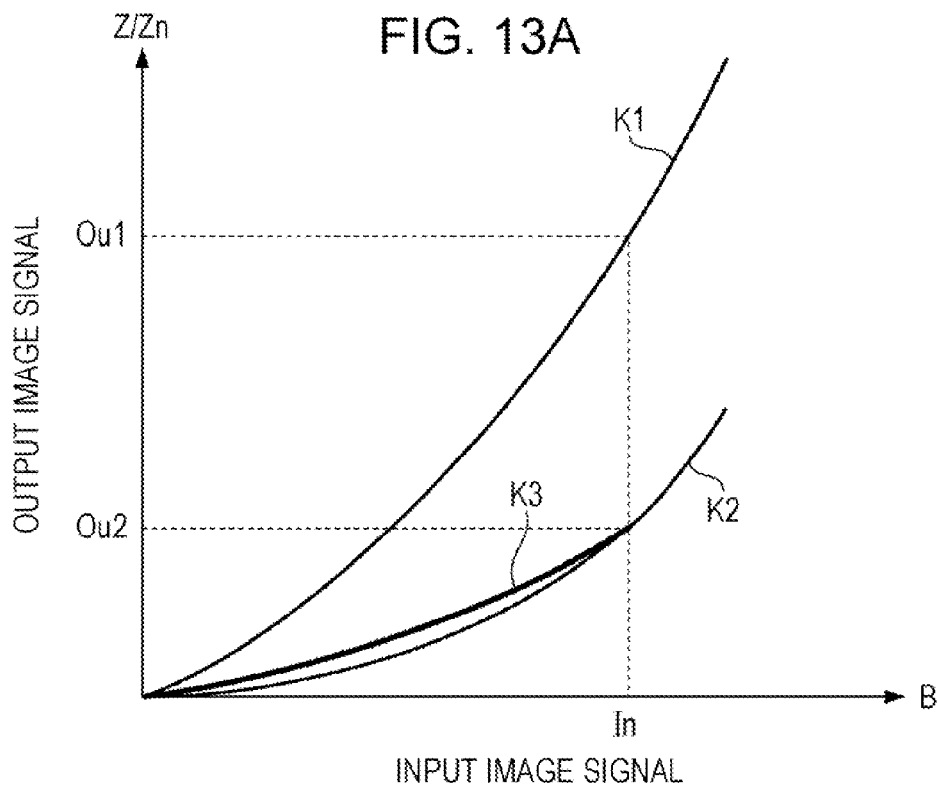
FIGS. 13A and 13B illustrate other examples of corrected tone curves.
Figure 13B:
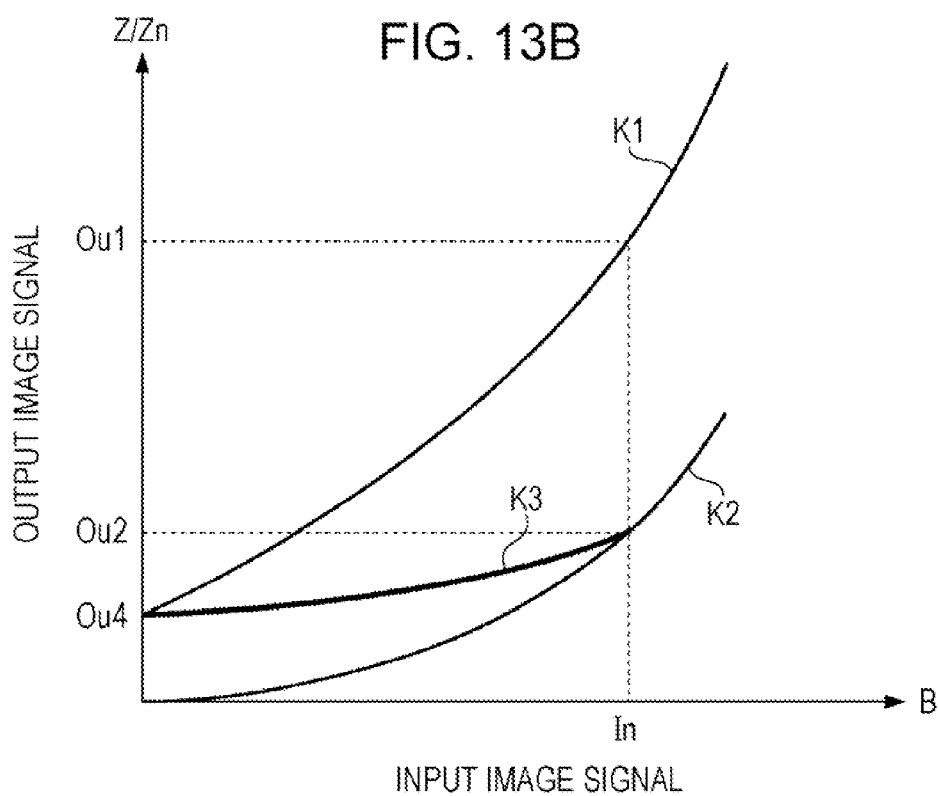

FIGS. 13A and 13B illustrate other examples of corrected tone curves. In these examples, as in FIG. 9, a tone curve concerning B is corrected.

In the example shown in FIG. 13A, tone characteristics are changed by applying a weight between a tone curve K1 obtained before the color temperature is changed and a tone curve K2 obtained after the color temperature is changed. That is, the origin and the point (In, Ou2) are connected with a convex downward curve instead of a straight line, and this convex downward curve is set to be a tone curve K3 in a region in which the tone value of the input image signal is equal to or smaller than Ou2. In the tone curve K3, smaller tone values are closer to the tone curve K1, while larger tone values are closer to the tone curve K2. In the example shown in FIG. 9, the gradient of the tone characteristics becomes discontinuous at the position (In, Ou2), which causes the tone value of the output image signal to change unnaturally at a boundary around the position (In, Ou2). On the other hand, in the example shown in FIG. 13A, the gradient of the tone characteristics is less discontinuous, and the tone value of the output image signal changes more naturally.

In the example shown in FIG. 13B, a tone curve K1 does not pass through the origin. This reflects the characteristics of the projector 20. That is, the projector 20 is influenced by natural light, and even if the tone value of an input image signal is 0, the actual tone value of an image displayed on the projector 20 may be higher than 0 due to the presence of natural light. The tone curve K1 is set by considering the influence of natural light. In FIG. 13B, the tone value of the output image signal when the tone value of the input image signal is 0 is indicated by Ou4. A tone curve K2 is drawn as a curve passing through the origin, in which case, a corrected tone curve K3 is drawn as a straight line or a curve passing through (0, Ou4) and (In, Ou2).

As in the above-described examples, the image adjusting method in this exemplary embodiment is more effective for a case in which the input/output relationship becomes non-linear, as in that of the projector 20.

The processing performed by the image adjusting apparatus 100 in this exemplary embodiment may be executed as a result of loading various programs stored in, for example, the HDD 13, into the main memory 12 and executing the loaded programs by using the CPU 11 of the terminal apparatus 10.

The processing performed by the image adjusting apparatus 100 may be realized by a program causing a computer to implement the following functions. A set color temperature obtaining function obtains a set color temperature which is set as a color temperature when a white image is displayed on the monitor 15 which displays an image. A maximum tone value calculating function calculates a maximum tone value of a reference color to be obtained, when the white image displayed on the monitor 15 is changed into a white image corresponding to the set color temperature. A tone characteristic setting function sets a tone characteristic of the reference color corresponding to the set color temperature, on the basis of the calculated maximum tone value of the reference color. If the calculated maximum tone value of the reference color is decreased from a maximum tone value of the reference color which has been obtained before the set color temperature is set, the tone characteristic setting function corrects, in a region in which a tone value of an input image signal is equal to or smaller than a predetermined value, the tone characteristic so that a tone value of an output image signal obtained as a result of converting the input image signal is increased.

A program implementing this exemplary embodiment may be provided by using a communication medium. Alternatively, the program may be provided as a result of storing the program in a recording medium, such as a compact disk read only memory (CD-ROM).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image adjusting apparatus comprising:
a set color temperature obtaining unit that obtains a set color temperature, wherein the set color temperature is set as a color temperature when a white image is displayed in an image display apparatus which displays an image;
a maximum tone value calculator that calculates a maximum tone value of a reference color to be obtained when the displayed white image displayed in the image display apparatus is changed into a white image corresponding to the set color temperature obtained by the set color temperature obtaining unit; and
a tone characteristic setting unit that sets a tone characteristic of the reference color corresponding to the set color temperature, based on the maximum tone value of the reference color calculated by the maximum tone value calculator, wherein the tone characteristic setting unit only corrects the tone characteristic when a decrease in the maximum tone value relative to a previous maximum value reaches a predefined threshold that is greater than zero;
wherein the tone characteristic setting unit corrects the tone characteristic in a region in which a tone value of an input image signal is equal to or smaller than a predetermined value so that a tone value of an output image signal obtained as a result of converting the input image signal is increased in response to determining that the maximum tone value of the reference color is decreased from a maximum tone value of the reference color that has been obtained before the set color temperature is set.

2. The image adjusting apparatus according to claim 1, wherein the tone characteristic setting unit changes a range of the region in accordance with a decrease in the maximum tone value.

3. The image adjusting apparatus according to claim 2, wherein the tone characteristic setting unit corrects the tone characteristic such that the tone characteristic becomes linear in the region.

4. The image adjusting apparatus according to claim 3, further comprising:
a characteristic value information obtaining unit that obtains a color value of a white image displayed in the image display apparatus when using a maximum tone value of a reference color used in the image display apparatus, and also obtains a tone characteristic of the image display apparatus,
wherein the maximum tone value calculator calculates the maximum tone value of the reference color to be obtained when the white image displayed in the image display apparatus is changed into a white image corresponding to the set color temperature, on the basis of the color value of the white image obtained by the characteristic value information obtaining unit and a color value of the white image corresponding to the set color temperature.

5. The image adjusting apparatus according to claim 2, further comprising:
a characteristic value information obtaining unit that obtains a color value of a white image displayed in the image display apparatus when using a maximum tone value of a reference color used in the image display apparatus, and also obtains a tone characteristic of the image display apparatus,
wherein the maximum tone value calculator calculates the maximum tone value of the reference color to be obtained when the white image displayed in the image display apparatus is changed into a white image corresponding to the set color temperature, on the basis of the color value of the white image obtained by the characteristic value information obtaining unit and a color value of the white image corresponding to the set color temperature.

6. The image adjusting apparatus according to claim 1, wherein the tone characteristic setting unit corrects the tone characteristic such that the tone characteristic becomes linear in the region.

7. The image adjusting apparatus according to claim 6, further comprising:
a characteristic value information obtaining unit that obtains a color value of a white image displayed in the image display apparatus when using a maximum tone value of a reference color used in the image display apparatus, and also obtains a tone characteristic of the image display apparatus,
wherein the maximum tone value calculator calculates the maximum tone value of the reference color to be obtained when the white image displayed in the image display apparatus is changed into a white image corresponding to the set color temperature, on the basis of the color value of the white image obtained by the characteristic value information obtaining unit and a color value of the white image corresponding to the set color temperature.

8. The image adjusting apparatus according to claim 1, further comprising:
a characteristic value information obtaining unit that obtains a color value of a white image displayed in the image display apparatus when using a maximum tone value of a reference color used in the image display apparatus, and also obtains a tone characteristic of the image display apparatus,
wherein the maximum tone value calculator calculates the maximum tone value of the reference color to be obtained when the white image displayed in the image display apparatus is changed into a white image corresponding to the set color temperature, on the basis of the color value of the white image obtained by the characteristic value information obtaining unit and a color value of the white image corresponding to the set color temperature.

9. The image adjusting apparatus according to claim 1, wherein the predetermined value is an amount of the decrease from the maximum tone value of the reference color.

10. An image adjusting system comprising:
an image display apparatus that displays an image on the basis of an output image signal which is obtained as a result of converting a tone of an input image signal in accordance with a predetermined tone characteristic;
a set color temperature obtaining unit that obtains a set color temperature, wherein the set color temperature is set as a color temperature when a white image is displayed in the image display apparatus;
a maximum tone value calculator that calculates a maximum tone value of a reference color to be obtained when the white image displayed in the image display apparatus is changed into a white image corresponding to the set color temperature obtained by the set color temperature obtaining unit; and
a tone characteristic setting unit that sets a tone characteristic of the reference color corresponding to the set color temperature, based on the maximum tone value of the reference color calculated by the maximum tone value calculator, wherein the tone characteristic setting unit only corrects the tone characteristic when a decrease in the maximum tone value relative to a previous maximum value reaches a predefined threshold that is greater than zero;
wherein the tone characteristic setting unit corrects the tone characteristic in a region in which a tone value of an input image signal is equal to or smaller than a predetermined value so that a tone value of an output image signal obtained as a result of converting the input image signal is increased in response to determining that the maximum tone value of the reference color calculated by the maximum tone value calculator is decreased from a maximum tone value of the reference color that has been obtained before the set color temperature is set.

11. The image adjusting system according to claim 10, wherein the predetermined value is the amount of decrease from the maximum tone value of the reference color.

12. An image adjusting method comprising:
obtaining a set color temperature, wherein the set color temperature is set as a color temperature when a white image is displayed in an image display apparatus which displays an image;

calculating a calculated maximum tone value of a reference color that is obtained when the displayed white image displayed in the image display apparatus is changed into a white image corresponding to the set color temperature;

setting a tone characteristic of the reference color corresponding to the set color temperature, based on the calculated maximum tone value of the reference color; and correcting the tone characteristic in a region in which a tone value of an input image signal is equal to or smaller than a predetermined value so that a tone value of an output image signal obtained as a result of converting the input image signal is increased only when a decrease in the calculated maximum tone value of the reference color relative to a previous maximum value reaches a predefined threshold that is greater than zero.

13. The image adjusting method according to claim 12, wherein the predetermined value is the amount of decrease from the maximum tone value of the reference color.

14. A non-transitory computer readable medium storing a program causing a computer to execute a process, the process comprising:

obtaining a set color temperature, wherein the set color temperature is set as a color temperature when a white image is displayed in an image display apparatus which displays an image;

calculating a maximum tone value of a reference color to be obtained when the white image displayed in the image display apparatus is changed into a white image corresponding to the set color temperature; and setting a tone characteristic of the reference color corresponding to the set color temperature, based on the calculated maximum tone value of the reference color, correcting the tone characteristic in a region in which a tone value of an input image signal is equal to or smaller than a predetermined value so that a tone value of an output image signal obtained as a result of converting the input image signal is increased only when a decrease in the calculated maximum tone value of the reference color relative to a previous maximum value reaches a predefined threshold that is greater than zero.

15. The non-transitory computer readable medium according to claim 14, wherein the predetermined value is the amount of decrease from the maximum tone value of the reference color.

* * * * *